(12) United States Patent
Fukuman et al.

(10) Patent No.: US 10,210,435 B2
(45) Date of Patent: Feb. 19, 2019

(54) OBJECT DETECTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Masumi Fukuman, Kariya (JP); Motonari Ohbayashi, Nagakute (JP); Akihiro Kida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/918,920

(22) Filed: Oct. 21, 2015

(65) Prior Publication Data

US 2016/0117841 A1    Apr. 28, 2016

(30) Foreign Application Priority Data

Oct. 22, 2014    (JP) ................................. 2014-215092

(51) Int. Cl.
*G06K 9/00* (2006.01)
*G06K 9/68* (2006.01)
(Continued)

(52) U.S. Cl.
CPC ......... *G06K 9/685* (2013.01); *G06K 9/00805* (2013.01); *G06K 9/036* (2013.01);
(Continued)

(58) Field of Classification Search
CPC ........... G06K 9/00791; G06K 9/00798; G06K 9/00805; G06K 9/00825; G06T 7/00;
(Continued)

(56) References Cited

U.S. PATENT DOCUMENTS 3,418,625 A    12/1968    Nigel
5,122,990 A     6/1992    Deines
(Continued)

FOREIGN PATENT DOCUMENTS

CN    103605125    2/2014
JP    S63127179    5/1988
(Continued)

OTHER PUBLICATIONS

U.S. Appl. No. 14/880,526, dated Oct. 12, 2015, Fukuman, et al.
(Continued)

*Primary Examiner* — Jose L Couso
(74) *Attorney, Agent, or Firm* — Knobbe, Martens, Olson & Bear, LLP (57) ABSTRACT

An object detection apparatus for detecting an object around a moving object carrying the apparatus by transmitting a probe wave and receiving reflections of the probe wave from the object via a plurality of ranging sensors attached to the moving object. In the apparatus, a tentative same-object determiner is configured to, if it is determined by a same-object determiner that the objects detected in the current and previous cycles are not the same, determine whether or not the objects detected in the current and previous cycles are likely to be the same. A determination suspender is configured to, if it is determined that the objects detected in the current and previous cycles are likely to be the same, suspend determining that the objects detected in the current and previous cycles are not the same.

10 Claims, 6 Drawing Sheets (51) Int. Cl.
*G06K 9/03* (2006.01)
*G06K 9/62* (2006.01)

(52) U.S. Cl.
CPC .. *G06K 9/6293* (2013.01); *G06T 2207/10132* (2013.01); *G06T 2207/30261* (2013.01)

(58) Field of Classification Search
CPC . G06T 7/254; G06T 7/55; G06T 2207/10132; G06T 2207/30248–2207/30252; G06T 2207/30261–2207/30264; G08G 1/16; G08G 1/166; B60W 30/08; B60W 30/095; B60W 30/0953; B60W 30/0956; G01S 7/52004; G01S 13/86; G01S 13/862; G01S 13/865; G01S 13/867; G01S 13/87; G01S 13/93; G01S 15/025; G01S 15/46; G01S 15/66; G01S 15/93; G01S 15/931; G01S 17/93; G01S 2013/9375; G01S 2013/9378; G01S 2013/9382; G01S 2013/9385; G01S 2013/9389; G01S 2013/9392; G01S 2013/9396; G01S 2015/465; G01S 2015/938; G01S 2205/002; G01S 7/524; G01S 7/527; G01S 7/529; G01S 7/539; G01S 15/003; G01S 15/10; G01S 15/105; G01S 15/87; G01S 15/878; Y10S 367/909
See application file for complete search history.

(56) References Cited

U.S. PATENT DOCUMENTS

| | | | |
|---|---|---|---|
| 5,315,562 A | 5/1994 | Bradley | |
| 5,689,250 A | 11/1997 | Kremser | |
| 5,761,155 A | 6/1998 | Eccardt et al. | |
| 5,923,282 A | 7/1999 | Honma et al. | |
| 5,940,011 A | 8/1999 | Agravante et al. | |
| 6,289,282 B1 | 9/2001 | Hassler | |
| 6,434,486 B1 | 8/2002 | Studt | |
| 6,898,528 B2 | 5/2005 | Zorka | |
| 7,068,155 B2 | 6/2006 | Kade | |
| 7,202,776 B2* | 4/2007 | Breed | B60N 2/2863 340/435 |
| 7,873,181 B1 | 1/2011 | Maluf | |
| 8,108,147 B1* | 1/2012 | Blackburn | G08G 1/166 235/454 |
| 8,452,506 B2 | 5/2013 | Groult | |
| 8,605,947 B2* | 12/2013 | Zhang | G06K 9/00798 348/116 |
| 8,989,944 B1* | 3/2015 | Agarwal | G01S 13/87 340/425.5 |
| 9,221,396 B1 | 12/2015 | Zhu et al. | |
| 9,507,023 B2 | 11/2016 | Nakano | |
| 9,541,644 B2 | 1/2017 | Hoenes et al. | |
| 2002/0047780 A1 | 4/2002 | Nishimoto et al. | |
| 2003/0195704 A1 | 10/2003 | Sekiguchi | |
| 2004/0238249 A1 | 12/2004 | Kim | |
| 2005/0046606 A1 | 3/2005 | Yoneda | |
| 2005/0195071 A1 | 9/2005 | Ewerhart et al. | |
| 2006/0031015 A1 | 2/2006 | Paradie | |
| 2006/0085177 A1 | 4/2006 | Toyama et al. | |
| 2006/0119473 A1* | 6/2006 | Gunderson | B60Q 9/006 340/435 |
| 2007/0176822 A1* | 8/2007 | Shirakawa | G01S 13/003 342/28 |
| 2008/0068146 A1 | 3/2008 | Cauldwell | |
| 2008/0204208 A1 | 8/2008 | Kawamata et al. | |
| 2009/0299662 A1 | 12/2009 | Fehrenbach | |
| 2010/0214872 A1 | 8/2010 | Schmid et al. | |
| 2011/0044507 A1 | 2/2011 | Strauss et al. | |
| 2011/0133917 A1 | 6/2011 | Zeng | |
| 2011/0241857 A1 | 10/2011 | Brandenburger et al. | |
| 2012/0307594 A1 | 12/2012 | Enoue et al. | |
| 2014/0340993 A1 | 11/2014 | Honda | |
| 2015/0097704 A1 | 4/2015 | Kwon | |
| 2015/0310281 A1* | 10/2015 | Zhu | G06K 9/00805 382/104 |
| 2016/0253575 A1* | 9/2016 | Kakegawa | G08G 1/165 701/70 |
| 2017/0261602 A1 | 9/2017 | Olshansky et al. | |

FOREIGN PATENT DOCUMENTS

| | | |
|---|---|---|
| JP | H06-138225 | 5/1994 |
| JP | H06-150195 | 5/1994 |
| JP | 2005-070943 A | 3/2005 |
| JP | 2008-039497 | 2/2008 |
| JP | 2008-122137 | 5/2008 |
| JP | 2013-124982 | 6/2013 |
| JP | 2014-089077 A | 5/2014 |
| JP | 2014-093039 | 5/2014 |
| JP | 2015-004562 | 1/2015 |
| KR | 2013-0119674 | 11/2013 |
| WO | WO 2005/091015 | 9/2005 |

OTHER PUBLICATIONS

U.S. Appl. No. 14/887,623, dated Oct. 20, 2015, Fukuman, et al.
U.S. Appl. No. 14/887,625, dated Oct. 20, 2015, Fukuman, et al.
U.S. Appl. No. 14/918,319, dated Oct. 20, 2015, Fukuman, et al.
U.S. Appl. No. 14/918,330, dated Oct. 20, 2015, Fukuman, et al.
U.S. Appl. No. 14/918,373, dated Oct. 20, 2015, Fukuman, et al.
U.S. Appl. No. 14/919,498, dated Oct. 21, 2015, Fukuman, et al.
U.S. Appl. No. 14/919,562, dated Oct. 21, 2015, Fukuman, et al.
Installation and Operation of Ship Navigation System, Beijing Institute of Technology Press, dated Aug. 2014 in 8 pages.
Chinese document, "the basic characteristtics of a multiple echo" in 8 pages.
"Study on Airborne Ultrasonic Position and Velocity Measurement of Multiple Objects Using Chirp Signal", by Sakai Ko, Kurosawa Minoru, Hirata Shinnosuke (Tokyo Institute of Technology), Orino Yuichiro (The University of Shiga Prefecture), Acoustical Society of Japan Spring Meeting, Mar. 2013, p. 1451-152, in 4 pages.
United States Patent and Trademark Office, Office Action, U.S. Appl. No. 14/880,526, dated Jul. 6, 2017 in 12 pages.
United States Patent and Trademark Office, Final Office Action, U.S. Appl. No. 14/880,526, dated Feb. 28, 2018 in 11 pages.
United States Patent and Trademark Office, Office Action, U.S. Appl. No. 14/918,373, dated Dec. 19, 2017 in 13 pages.
United States Patent and Trademark Office, Final Office Action, U.S. Appl. No. 14/918,373, dated Apr. 9, 2018 in 9 pages.
United States Patent and Trademark Office, Office Action, U.S. Appl. No. 14/918,330, dated Oct. 20, 2017 in 13 pages.
United States Patent and Trademark Office, Final Office Action, U.S. Appl. No. 14/918,330, dated Mar. 12, 2018 in 11 pages.
United States Patent and Trademark Office, Office Action, U.S. Appl. No. 14/887,623, dated Aug. 30, 2017 in 13 pages.
United States Patent and Trademark Office, Office Action, U.S. Appl. No. 14/918,319, dated Sep. 5, 2017 in 13 pages.
United States Patent and Trademark Office, Final Office Action, U.S. Appl. No. 14/918,319, dated Feb. 28, 2018 in 12 pages.
United States Patent and Trademark Office, Office Action, U.S. Appl. No. 14/919,562, dated Sep. 12, 2017 in 14 pages.
United States Patent and Trademark Office, Final Office Action, U.S. Appl. No. 14/919,562, dated Mar. 29, 2018 in 12 pages.
United States Patent and Trademark Office, Final Office Action, U.S. Appl. No. 14/887,623, dated May 7, 2018 in 38 pages.
United States Patent and Trademark Office, Office Action, U.S. Appl. No. 14/887,625, dated May 10, 2018 in 26 pages.
United States Patent and Trademark Office, Advisory Action, U.S. Appl. No. 14/880,526, dated May 25, 2018, in 4 pages.
United States Patent and Trademark Office, Final Office Action, U.S. Appl. No. 14/918,319, dated Jul. 19, 2018 in 12 pages.
Tian Fenxia, "Pipeline Obstacle Detecting and Locating Based on Ultrasonic Waves", Southwest Jiaotong Postraduate Dissertation, Jun. 2013, TP391, p. 30.

(56) References Cited

OTHER PUBLICATIONS

Notice of Allowance and Fee(s) Due, U.S. Appl. No. 14/919,562, dated Aug. 1, 2018, in 11 pages.

* cited by examiner

FIG.9

OBJECT DETECTION APPARATUS

CROSS-REFERENCE TO RELATED APPLICATION

This application is based on and claims the benefit of priority from earlier Japanese Patent Application No. 2014-215092 filed Oct. 22, 2014, the description of which is incorporated herein by reference.

BACKGROUND

Technical Field

The present invention relates to an object detection apparatus for detecting an object around a vehicle carrying the apparatus.

Related Art

Conventionally, a known object detection apparatus, as disclosed in Japanese Patent Application Laid-Open Publication No. 2014-89077, includes at least one ranging sensor, such as an ultrasonic sensor or the like, mounted in a vehicle to detect an object, such as a pedestrian, an obstacle or the like, around the vehicle, and based on detection results, performs various types of control, such as actuation of a braking device and notification to a driver, for improving vehicle driving safety.

The object detection apparatus disclosed in Japanese Patent Application Laid-Open Publication No. 2014-89077 includes a plurality of ranging sensors mounted in the vehicle to calculate a widthwise position of the object based on the principle of triangulation, where the widthwise position of the object refers to a position of the object in a widthwise or cross vehicle direction perpendicular to a traveling direction of the vehicle. If the widthwise position of the object is within the vehicle width, it is determined that the object has been detected. If the widthwise position of the object is not within the vehicle width, it is determined that the object has not been detected. Performing such a determination process can prevent erroneously detecting an object that is actually less likely to contact the vehicle as an object that is likely to contact the vehicle.

When an object is detected using the ranging sensors, reflections of ultrasound waves of the ranging sensors may vary with object shapes and environments around the vehicle. Variations of the reflections may cause variations in detected position of the object. Therefore, despite that actually the same object has been detected, it may be determined that another object has been detected, or despite that actually another object (than the object of interest) has been detected, it may be determined that the same object has been detected. There is concern that such incorrect determinations may cause intervention of control for improving the vehicle driving safety to be permitted despite that the intervention of such control being unnecessary, or to be missed despite the intervention of such control being necessary.

In consideration of the foregoing, exemplary embodiments of the present invention are directed to providing an object detection apparatus capable of avoiding determining the identity of an object based on incorrect position information.

SUMMARY

In accordance with an exemplary embodiment of the present invention, there is provided an object detection apparatus for detecting an object around a moving object with a plurality of ranging sensors attached to the moving object by transmitting a probe wave and receiving reflections of the probe wave from the object via the plurality of ranging sensor. The apparatus includes: a first detector configured to detect the object based on a direct wave that is a first reflection of the probe wave from the object, the probe wave and the first reflection being respectively transmitted and received by the same ranging sensor that is a first ranging sensor that is one of the plurality of ranging sensors; a second detector configured to detect the object based on an indirect wave that is a second reflection of the probe wave from the object, the second reflection being received by a second ranging sensor that is another one of the plurality of ranging sensors; an object-position calculator configured to calculate an object position as a position of the object based on the detections of the first and second detectors according to the principle of triangulation; a same-object determiner configured to, based on the object position calculated by the object-position calculator in the previous cycle and the object position calculated by the object-position calculator in the current cycle, determine whether or not the object detected by the first and second detectors in the previous cycle and the object detected by the first and second detectors in the current cycle are the same; a tentative same-object determiner configured to, if it is determined by the same-object determiner that the object detected by the first and second detectors in the previous cycle and the object detected by the first and second detectors in the current cycle are not the same and if a degree of confidence of the object detected by the first and second detectors in the previous cycle is equal to or greater than a predetermined degree, determine whether or not the object detected by the first and second detectors in the previous cycle and the object detected by the first and second detectors in the current cycle are likely to be the same; and a determination suspender configured to, if it is determined by the tentative same-object determiner that the object detected by the first and second detectors in the previous cycle and the object detected by the first and second detectors in the current cycle are likely to be the same, suspend determining that the object detected by the first and second detectors in the previous cycle and the object detected by the first and second detectors in the current cycle are not the same.

In the above embodiment, if, based on information about the object position detected by the sensors in the previous cycle and the object position detected by the sensors in the current cycle, it is determined that the object detected in the previous cycle and the object detected in the current cycle are not the same, then the tentative same-object determination process is performed, where it is determined whether or not the object detected in the previous cycle and the object detected in the current cycle are likely to be the same, provided the object detected in the previous cycle has a predetermined or higher degree of confidence. More specifically, if it is determined that the object position detected in the current cycle is out of the first range of determination including and catered at the predicted object position, it is determined whether or not the object position detected in the current cycle is within the second range of determination, provided the object detected in the previous cycle has a predetermined or higher degree of confidence. If it is determined that the object detected in the previous cycle and the object detected in the current cycle are likely to be the same, then it is suspended determining that the object detected in the previous cycle and the object detected in the current cycle are different objects.

When an object is detected using the ranging sensors, reflections of prove waves, such as ultrasonic waves, of the ranging sensors from the object may vary with object shapes and the environment around the vehicle. Variations of the reflections may cause variations in detected position of the object leading to transient detection errors of the object position. Therefore, the determination that the object detected in the previous cycle and the object detected in the current cycle are not the same may be caused by such transient detection errors. Such a determination that the object in the previous cycle and the object in the current cycle are not the same may cause intervention of control for improving the vehicle driving safety to be permitted at undesired timings. With the above configuration, in cases where the object detected in the previous cycle has a high degree of confidence and it is likely that the transient detection errors are likely to have occurred, the tentative same-object determination process is performed. If in the tentative same-object determination process it is determined that the object detected in the previous cycle and the object detected in the current cycle are likely to be the same, determining that the object detected in the previous cycle and the object detected in the current cycle are different objects is suspended. Therefore, even if an incorrect object position is calculated, this can avoid a same-object determination based on the incorrect calculated object.

DESCRIPTION OF SPECIFIC EMBODIMENTS

Example embodiments will now be described more fully with reference to the accompanying drawings. Example embodiments are provided so that this disclosure will be thorough, and will fully convey the scope to those who are skilled in the art. Numerous specific details are set forth such as examples of specific components to provide a thorough understanding of embodiments of the present disclosure. It will be apparent to those skilled in the art that example embodiments may be embodied in many different forms and that neither should be construed to limit the scope of the disclosure. Identical or equivalent components or components of equal or equivalent action are thereby identified by the same or similar reference numerals. An object detection apparatus mounted in a moving object in accordance with one embodiment of the present invention will now be explained with reference to the accompanying drawings.

The object detection apparatus of the present embodiment is mounted in a vehicle as the moving object and is configured to receive object sensing information from ranging sensors mounted in the vehicle to detect an object around the vehicle, such as another vehicle, a roadway construction or the like. An object detection system in accordance with the present embodiment will now be explained with reference to FIG. 1.

Figure 1:
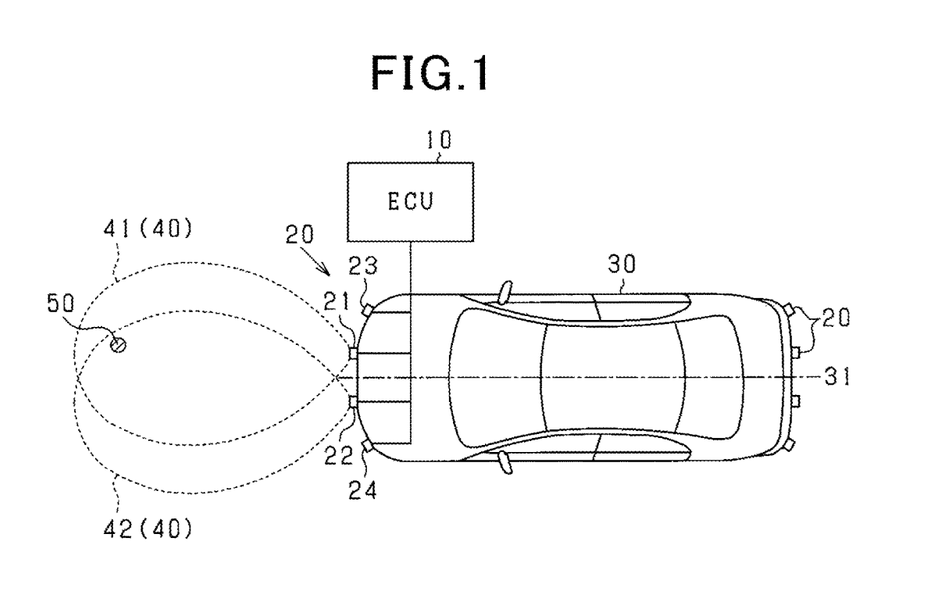
FIG. 1 is a schematic of an object detection system in accordance with one embodiment of the present invention.

Referring to FIG. 1, each of ranging sensors 20 may be an ultrasonic sensor having a function of transmitting an ultrasonic wave at a frequency in a range of 20-100 kHz as a probe wave and a function of receiving a reflection of the prove wave from an object. In the present embodiment, four ranging sensors 20 are attached to a front portion of the vehicle 30 (e.g., a front bumper) and spaced apart from each other by a predetermined spacing in a widthwise direction of the vehicle perpendicular to the traveling direction of the vehicle 30. More specifically, the ranging sensors 20 include two center sensors (first and second sensors 21, 22) in proximity to the center line 31 of the vehicle 30 and at symmetrical positions about the center line 31, and corner sensors 23, 24 at front left and right corners of the vehicle 30. Four more ranging sensor 20 are attached to a rear portion of the vehicle 30 (e.g., a rear bumper) at similar positions, therefore including two center sensors and two corner sensors. These rear ranging sensors attached to the rear portion of the vehicle 30 have the same functions as the ranging sensors attached to the front portion of the vehicle 30. Therefore, descriptions for the rear ranging sensors 20 will not be repeated below.

For each of the ranging sensors 20, the ranging sensor has a range of direct object detection 40 such that a reflection of the probe wave transmitted by the ranging sensor from an object within the range of direct object detection can be received by the ranging sensor. Any pair of adjacent ranging sensors 20 are attached to the front portion of the vehicle 30 so that the ranges of direct object detection 40 of the adjacent ranging sensors 20 at least partially overlap each other. Although only the ranges of direct object detection 41, 42 of the first and second ranging sensors (center sensors) 21, 22 are shown in FIG. 1, the corner sensors 23, 24 may also have similar ranges of direct object detection 40. Each of the ranging sensors 20 has a threshold value for amplitude of reflections. Upon receipt of a reflection having an amplitude equal to or greater than the threshold value, the ranging sensor 20 transmits object sensing information including a receipt time of the reflection to an electronic control unit (ECU) 10 as the object detection apparatus of the present embodiment.

The ECU 10 includes a microcomputer formed of CPU and various memories, such as RAM and ROM, and is configured to detect the object(s) 50 around the vehicle 30 based on the object sensing information of the object(s) 50 received from the ranging sensors 20. More specifically, the ECU 10 transmits control signals to at least one of the ranging sensors 20 every predetermined time interval (e.g., every hundreds of milliseconds) to instruct the ranging sensors 20 to transmit the probe wave. Upon receipt of the object sensing information of the object 50 from the ranging sensors 20, the ECU 10 determines the presence or absence of the object 50 around the vehicle based on the received sensing information. When it is determined that the object 50 is present around the vehicle 30, then the ECU 10 performs a vehicle-object interaction avoidance control, such as a steering angle control or a deceleration control, or notification to a driver of the vehicle 30 using an audible alarm so that the vehicle 30 does not interact with the object 50.

The ECU 10 transmits transmission instructions to the ranging sensors 20 to cause each of the ranging sensors 20 to transmit an ultrasonic wave as a probe wave in a predefined sequence at predetermined time intervals. In the present embodiment, in response to the transmission instructions from the ECU 10, the first center sensor 21 transmits an ultrasonic wave and then the second center sensor 22 transmits an ultrasonic wave. Subsequently, the corner sensor 23 transmits an ultrasonic wave and then the corner sensor 24 transmits an ultrasonic wave. The probe waves are sequentially transmitted at predefined time intervals such that the sequentially transmitted probe waves do not interfere with each other. In addition, in the present embodiment, only the first received reflection at the ranging sensors 20 after the sequential transmissions of the ultrasonic waves from the ranging sensors 21, 22, 23, 24 is valid, and the second to fourth reflections received after receipt or the first received reflection are invalidated.

The ECU 10 uses the object sensing information of the object 50 received from the ranging sensors 20 to calculate a position (i.e., coordinates) of the object 50 relative to the vehicle 30 (referred to as a relative position of the object 30) using the principle of triangulation. According to the well-known principle of triangulation, the coordinates of a measurement point are calculated using a known distance between two points and distances from the two points to the measurement point. According to such principle of triangulation, the ECU 10 calculates the relative position of the object 50 based on a known distance between two adjacent ranging sensors 20 whose ranges of direct object detection 40 at least partially overlap each other and measured distances from the two adjacent ranging sensors 20 to the object 50.

Figure 2:
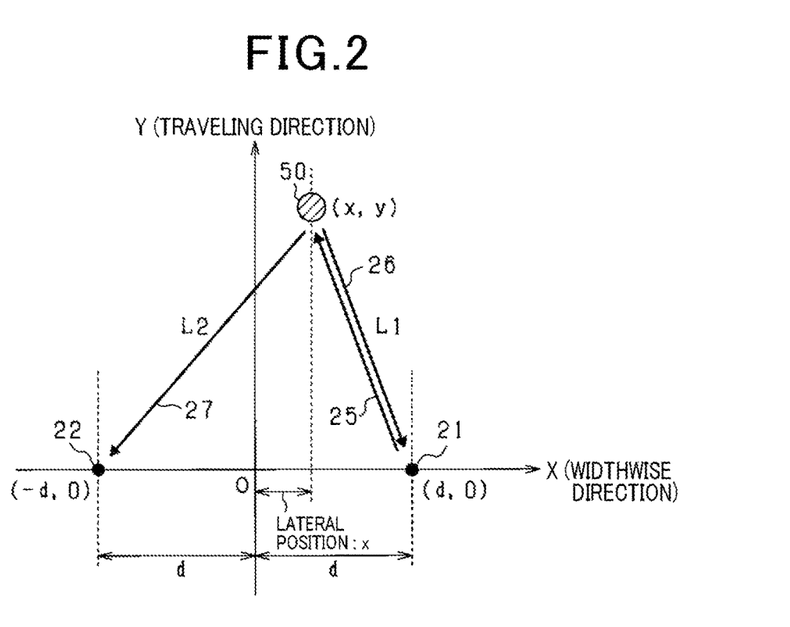
FIG. 2 is a schematic of calculating a position of an object by triangulation.

FIG. 2 is a schematic of calculating the detected relative position of the object 50, which shows the first and second center sensors 21, 22 and the object 50 in front of the first and second center sensors 21, 22 in plan view. In FIG. 2, the first center sensor 21 serves as an active sensor configured to transmit a probe wave 25 and receive a direct wave 26 that is a reflection of the probe wave 25 at a first location, and the second sensor 22 serves as a passive sensor configured to only receive an indirect wave 27 that is a reflection of the probe wave 25 transmitted by the first sensor 21 at a second location away from the first location.

The ECU 10 calculates an estimated (relative) position of the object 50 specified by X- and Y-coordinates x, y of the object 50 in a coordinate system defined by an X-axis being a straight line passing through the first and second sensors 21, 22 and a Y-axis being a straight line passing through a median between the first and second sensors 21, 22 and perpendicular to the X-axis. More specifically, in the present embodiment, the ECU 10 instructs the first center sensor (active sensor) 21 to transmit the probe wave 25. When the first center sensor 21 receives the direct wave 26 that is a reflection of the probe wave 25 from the object 50, the ECU 10 calculates a distance L1 between the first center sensor 21 and the object 50 based on the direct wave 26. When the second center sensor (passive sensor) 22 receives the indirect wave 27 that is a reflection of the probe wave 25 from the object 50, the ECU 10 calculates a distance L2 between the second sensor 22 and the object 50 based on the indirect wave 27.

A distance between an origin O of the coordinate system at which the X-axis and the Y-axis intersect and the first sensor 21 is equal to a distance between the origin O and the second sensor 22, which distances are denoted by d and stored beforehand in the ECU 10. The ECU 10 calculates a first time t1 and a second time t2, where the first time t1 is the time the direct wave 26 is received by the first sensor 21 subtracted by the time the probe wave 25 is transmitted by the first sensor 21 and the second time t2 is the time the indirect wave 27 is received by the second sensor 22 subtracted by the time the probe wave 25 is transmitted by the first sensor 21. The first time t1 multiplied by the speed of sound is twice the distance L1 between the first sensor 21 and the object 50. The second time t2 multiplied by the speed of sound is a sum of the distance L1 between the first sensor 21 and the object 50 and a distance L2 between the second sensor 22 and the object 50. The ECU 10 performs a triangulation calculation using the distance 2d between the first center sensor 21 and the second center sensor 22 and the first time t1 and the second time t2 to calculate the coordinates (x, y) of the object 50.

In the present embodiment, FIG. 2 shows an example where the first center sensor 21 serves as an active sensor and the second center sensor 22 serves as a passive sensor. Practically, coordinates of an object 50 can be calculated using any combination of adjacent sensors 21-24 in a similar manner based on the principle of triangulation. As for the ranging sensors attached to the rear portion of the vehicle 30, coordinates of an object 50 rearward of the vehicle 30 can be calculated using any combination of adjacent sensors attached to the rear portion of the vehicle 30 in a similar manner.

In the present embodiment, the ECU 10 sets, as an indication of the likelihood of the object being actually present, a confidence-level determination counter N (as a degree of confidence) for each of the ranging sensors 20 based on the number of times the same object has been detected. For each of the ranging sensors 20, the confidence-level determination counter N is incremented or decremented such that as the number of times the same object has been detected by the ranging sensor increases, the confidence-level determination counter N is increased. When the confidence-level determination counter N exceeds a threshold, it is determined that the object detected by the ranging sensor is actually present around the vehicle 30, so that intervention of the interaction avoidance control is permitted. If it is determined that the object detected in the previous cycle and the object detected in the current cycle are different, the confidence-level determination counter N is reset.

In the present embodiment, a same-object determination process is performed, in which it is determined whether or not objects detected by a respective one of the ranging sensors 20 in the current and previous cycles are the same. If it is determined that objects detected by one of the ranging sensors 20 in the current and previous cycles are the same, the value of the confidence-level determination counter N is incremented. More specifically, based on a history of positions of the objects detected in the previous cycles, an object position in the next cycle is predicted. Thereafter, the predicted object position and the object position calculated by the triangulation in the current cycle are compared. If the object position calculated by the triangulation in the current cycle is within a first range of determination including therein the predicted object position, it is determined that the object at the object position calculated by the triangulation in the current cycle and the object position calculated by the triangulation in the previous cycle are the same. Then the value of the confidence-level determination counter N is incremented by a predetermined value. If the value of the confidence-level determination counter N exceeds a predefined threshold after it is consecutively determined plural times that the object at the object position calculated by the triangulation in the current cycle and the object position calculated by the triangulation in the previous cycle are the same, intervention of the vehicle-object interaction avoidance control is permitted.

Figure 3:
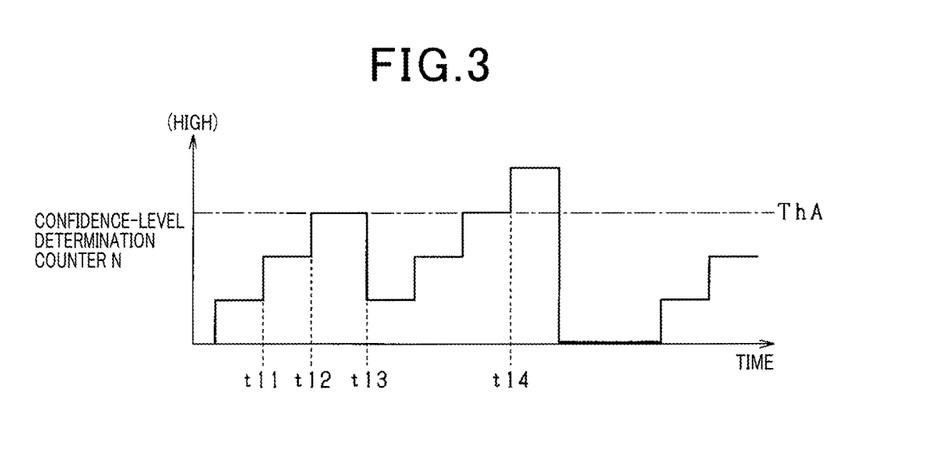
FIG. 3 is an example timing chart of a temporal development of a confidence-level determination counter N.

FIG. 3 shows an example of a temporal development of the confidence-level determination counter N. In the present embodiment, each ranging sensor has a respective confidence-level determination counter N. FIG. 3 shows an example of the temporal development of the confidence-level determination counter for one of the four ranging sensors 20 (e.g., the first center sensor 21).

If the object position calculated by the triangulation in the current cycle is within the first range of determination, then it is determined that the object detected in the previous cycle and the object detected in the current cycle are the same. As shown in FIG. 3, the confidence-level determination counter N is incremented (at times t11, t12). If the object position calculated by the triangulation in the current cycle is out of the first range of determination, then it is determined, in principle, that the object detected in the previous cycle and the object detected in the current cycle are different objects or not the same. Then, as shown in FIG. 3, the confidence-level determination counter N is rest (at time t13). If the value of the confidence-level determination counter N exceeds a counter threshold ThA (at time t14) after detecting other objects detected in consecutive cycles that are determined to be the same, the intervention of the vehicle-object interaction avoidance control is permitted.

In general, the reflections of ultrasound waves of the ranging sensors 20 may vary with object shapes and environments around the vehicle, which may cause the ranging sensors 20 to detect an object at an incorrect position (i.e., at a position where the detected object is not actually present). A large deviation between the object position predicted based on the history of the object positions detected in the previous cycles (i.e., the object position at which the object detected in the previous cycle is expected to be present in the current cycle) and the object position calculated in the current cycle, which may be caused by temporary detection errors, may lead to an incorrect determination that the object detected in the previous cycle and the object detected in the current cycle are not the same, and then the confidence-level determination counter N is reset. This may delay the intervention of the vehicle-object interaction avoidance control.

Addressing this concern, in the present embodiment, in cases where despite a large deviation between the object position predicted in the previous cycle and the object position calculated in the current cycle, the confidence level of the object detected in the previous cycle is high enough to determine that the detected object is likely to be present, a tentative same-object determination process is performed, in which it is determined whether or not the object detected in the previous cycle and the object detected in the current cycle are likely to be the same. If, in the tentative same-object determination process, it is determined that the object detected in the previous cycle and the object detected in the current cycle are likely to be the same, determining that the object detected in the previous cycle and the object detected in the current cycle are different objects is suspended.

More specifically, in the tentative same-object determination process, it is determined whether or not the object position calculated by the triangulation in the current cycle is within a second range of determination surrounding the first range of determination. If it is determined that the object position calculated in the current cycle is out of the second range of determination, then it is determined that the object detected in the previous cycle and the object detected in the current cycle are different objects. If it is determined that the object position calculated in the current cycle is within the second range of determination (but out of the first range of determination), then determining that the object detected in the previous cycle and the object detected in the current cycle are different objects is suspended.

Figure 4A:
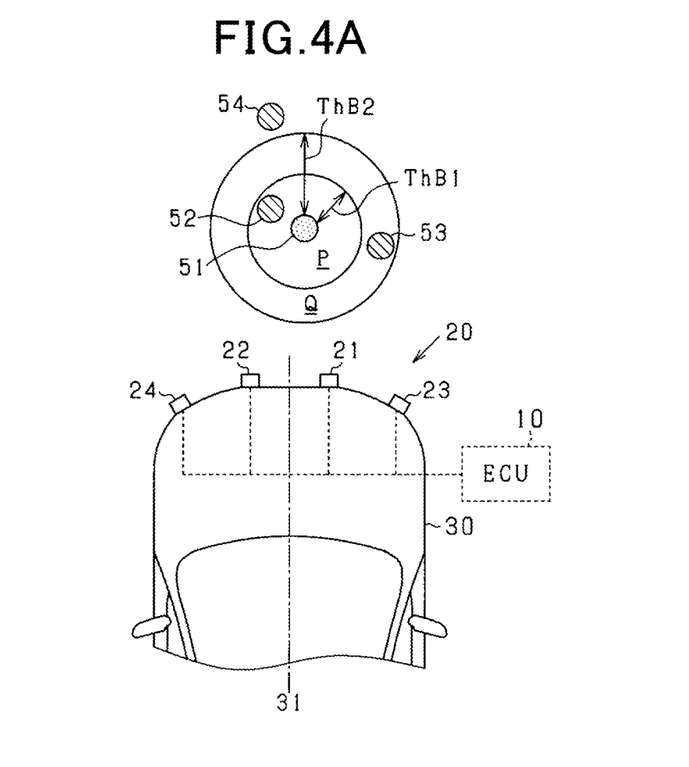
FIG. 4A is a schematic of a tentative same-object determination process.

FIG. 4A shows a schematic of the tentative same-object determination process. In FIG. 4A, the first determination range is a circular region P having a radius of a first threshold ThB1 and centered at the predicted position 51, and the second determination range is an annular region Q having an inner radius of the first threshold ThB1 and an outer radius of a second threshold ThB2 (where ThB2>ThB1) and centered at the predicted position 51.

In the example of FIG. 4A, the predicted position 51 and three detected object positions 52-54 are shown. If the object detected in the current cycle is at the position 52 that is within the first range of determination P, it is determined that the object detected in the previous cycle and the object detected in the current cycle are the same.

If the object detected in the current cycle is at the position 54 that is outside the first and second ranges of determination P, Q, then it is determined that the object detected in the previous cycle and the object detected in the current cycle are different objects. If the object detected in the current cycle is at the position 53 that is outside the first range of determination P, but within the second range of determination Q, then determining that the object detected in the previous cycle and the object detected in the current cycle are different objects is suspended (or forgone) and carried over to the subsequent cycles unless the degree of confidence of the object detected in the previous cycle is equal to or greater than a predetermined value.

In FIG. 4A, boundaries of the first and second ranges of determination P, Q are concentric circles centered at the predicted position 51. Alternatively, boundaries of the first and second ranges of determination P, Q may be ovals centered at the predicted position 51 that are long in the widthwise direction, which may be more advantageous because the detection errors of the ranging sensors 20 in the widthwise direction of the vehicle 30 are greater than the detection errors of the ranging sensors 20 in the traveling direction.

Figure 5:
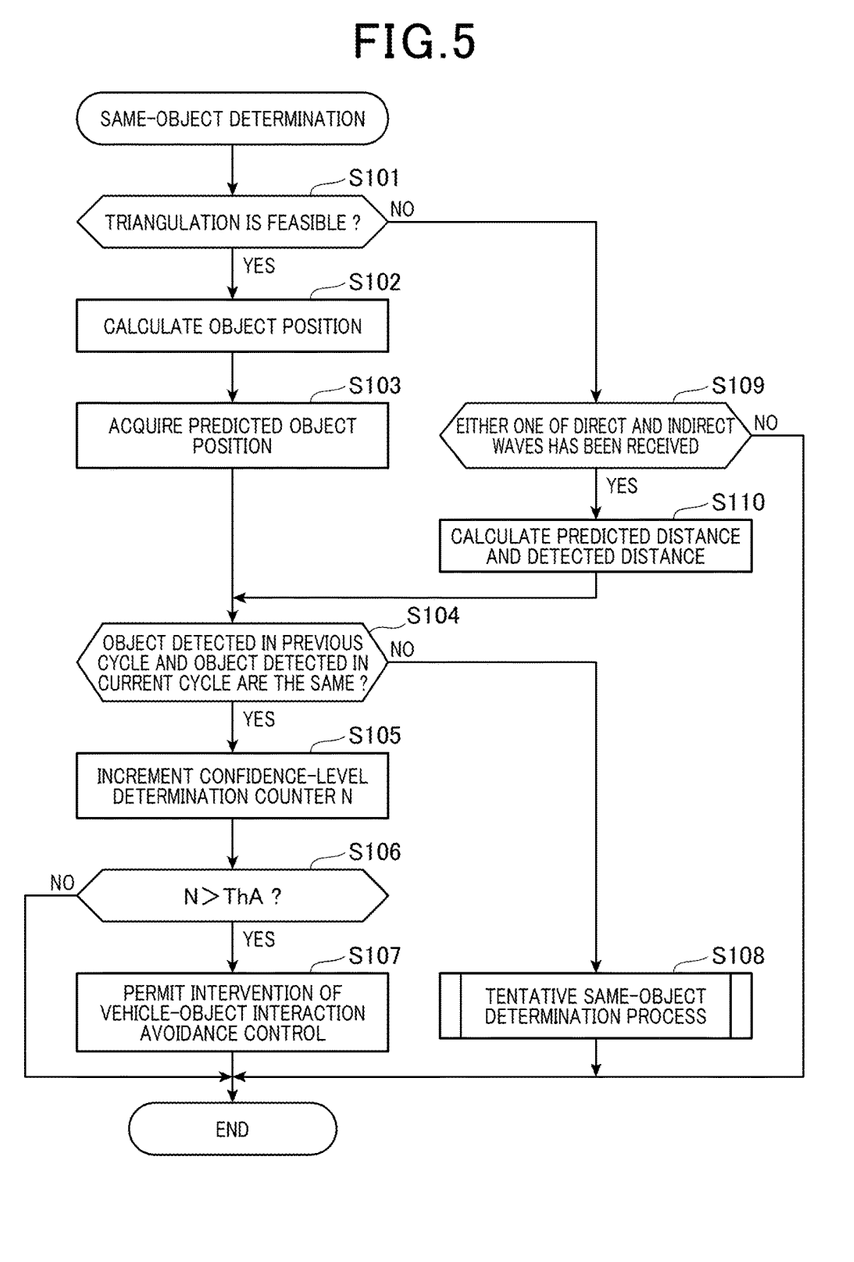
FIG. 5 is a flowchart of a same-object determination process.

FIG. 5 shows a flowchart of the same-object determination process in accordance with the present embodiment. This process is performed in the ECU 10 repeatedly every predetermined time interval.

Referring to FIG. 5, in step S101, it is determined whether or not the triangulation is feasible. For example, it is determined that the triangulation is feasible only if the direct wave 26 and the indirect wave 27 have been received during a predetermined wait period after transmission of the probe wave 25 from the ranging sensor 21. The predetermined wait period may be set to, for example, tens of milliseconds. If in step S101 it is determined whether or not the triangulation is feasible, then the process proceeds to step S102, where based on information about the received direct and indirect waves 26, 27, coordinates (x, y) specifying an object position are calculated according to the principle of triangulation in a manner as described with reference to FIG. 2.

Subsequently, in step S103, the predicted object position (i.e., the object position at which the object detected in the previous cycle is expected to be present in the current cycle) is acquired. In the present embodiment, a predicted position of the object 50 (see FIG. 1) is calculated based on the history of detected object positions calculated by the triangulation in the previous cycles. The predicted position of the object 50 (as a coordinate point) is calculated using parameters including coordinates of the objects detected, for example, in the previous cycle and the before the previous cycle, and a speed of the object 50 relative to the vehicle 30 (i.e., the relative speed of the object 50).

In step S104, it is determined whether or not the object detected in the previous cycle and the object detected in the current cycle are the same. More specifically, it is determined whether or not the object position detected in the current cycle is within the first range of determination P. In the present embodiment, only if all the following conditions (1-1) to (1-4) are met, it is determined that the object position detected in the current cycle is within the first range of determination P.

The condition (1-1) is that a difference between the x-coordinate of the predicted object position 51 and the x-coordinate of the detected objected position (i.e., the object position detected in the current cycle) is less than a first x-coordinate determination threshold ThB1$x$. The condition (1-2) is that a difference between the y-coordinate of the predicted object position 51 and the y-coordinate of the detected objected position is less than a first y-coordinate determination threshold ThB1$y$. The condition (1-3) is that a difference between the distance from the active sensor 21 to the predicted object position 51 and the detected distance calculated based on the direct wave 26 is less than a first direct-wave determination threshold ThB1$a$. The condition (1-4) is that a difference between the distance from the passive sensor 22 to the predicted object position 51 and the detected distance calculated based on the indirect wave 27 is less than a first indirect-wave determination threshold ThB1$b$.

If all the conditions (1-1) to (1-4) are met, it is determined in step S104 that the object detected in the previous cycle and the object detected in the current cycle are the same. Thereafter, the process proceeds to step S105, where the confidence-level determination counter N is incremented. Subsequently, in step S106, it is determined whether or not the confidence-level determination counter N has exceeded the counter threshold ThA. If N≤ThA, then the process ends. If N>ThA, then the process proceeds to step S107, where the intervention of the vehicle-object interaction avoidance control is permitted.

If in step S101 it is determined that the triangulation is infeasible, the process proceeds to step S109, where it is determined whether or not only either one of the direct wave 26 and the indirect wave 27 has been received. If in step S109 it is determined whether or not none of the direct wave 26 and the indirect wave 27 have been received during the predetermined wait period after transmission of the probe wave 25 from the ranging sensor 21, then the process ends.

If in step S109 it is determined that only either one of the direct wave 26 and the indirect wave 27 has been received during the predetermined wait period after transmission of the probe wave 25 from the ranging sensor 21, then the process proceeds to step S110. In step S110, a distance from the active sensor 21 to the predicted object position and a distance detected based on the reflection (the direct wave 26 or the indirect wave 27) are calculated. Thereafter, the process proceeds to step S104, where it is determined whether or not the object detected in the previous cycle and the object detected in the current cycle are the same. In this subroutine, in step S104, it is determined whether or not either one of the conditions (1-3) and (1-4), among the conditions (1-1) to (1-4), is met. If in step S104 it is determined that either one of the conditions (1-3) and (1-4) is met, the process proceeds to step S105.

Figure 6:
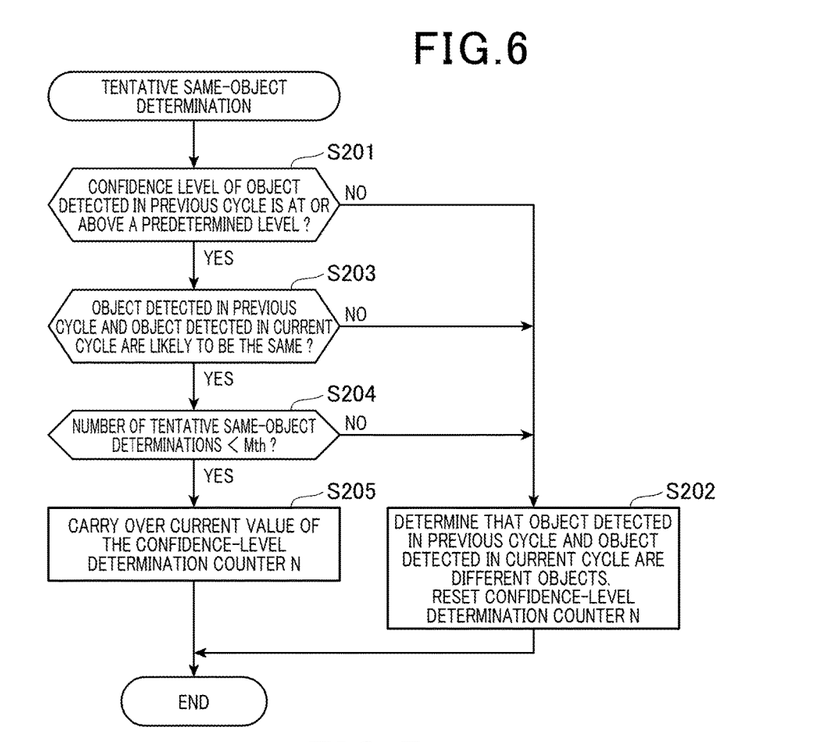
FIG. 6 is a flowchart of a tentative same-object determination process.

In addition, if the object position detected in the current cycle is out of the first range of determination P and thus it is determined in step S104 that the object detected in the previous cycle and the object detected in the current cycle are not the same, the process proceeds to step S108, where the tentative same-object determination process as shown in FIG. 6 is performed.

Referring to FIG. 6, in step S201, it is determined whether or not the confidence level of the object detected in the previous cycle is at or above a predetermined level. More specifically, the determination in step S201 is made by reading a previous value of the confidence-level determination counter N and then comparing the previous value of the confidence-level determination counter N and a criterion value. If it is determined that the previous value of the confidence-level determination counter N is equal to or greater than the criterion value, then the process proceeds to step S203, where it is determined whether or not the object detected in the previous cycle and the object detected in the current cycle are likely to be the same.

More specifically, in step S203, it is determined whether or not the object position detected in the current cycle is within the second range of determination Q. In the present embodiment, if the triangulation is feasible, it is determined that the object position detected in the current cycle is within the second range of determination Q only if all the following conditions (2-1) to (2-4) are met. If the triangulation is infeasible and if only either one of the direct wave 26 and the indirect wave 27 has been received, it is determined that the object position detected in the current cycle is within the second range of determination Q if it is determined that either one of the conditions (1-3) and (1-4) is met.

The condition (2-1) is that a difference between the x-coordinate of the predicted object position 51 and the x-coordinate of the detected objected position (i.e., the object position detected in the current cycle) is less than a second x-coordinate determination threshold ThB2$x$ such that ThB2$x$>ThB1$x$. The condition (2-2) is that a difference between the y-coordinate of the predicted object position 51 and the y-coordinate of the detected objected position is less than a second y-coordinate determination threshold ThB2$y$ such that ThB2$y$>ThB1$y$. The condition (2-3) is that a difference between the distance from the active sensor 21 to the predicted object position 51 and the distance detected based on the direct wave 26 is less than a second direct-wave determination threshold ThB2$a$ such that ThB2$a$>ThB1$a$. The condition (2-4) is that a difference between the distance from the passive sensor 22 to the predicted object position 51 and the distance detected based on the indirect wave 27 is less than a second indirect-wave determination threshold ThB2$b$ such that ThB2$b$>ThB1$b$.

If in step S203 it is determined that the object detected in the previous cycle and the object detected in the current cycle are likely to be the same, then the process proceeds to step S204, where it is determined whether or not the number of tentative same-object determinations is less than a predetermined value Mth, where the number of tentative same-object determinations refers to the number of times of consecutively determining in step S203 that the object detected in the previous cycle and the object detected in the current cycle are likely to be the same. If in step S204 it is determined that the number of tentative same-object determinations is less than the predetermined value Mth, then the process proceeds to step S205, where the value of the confidence-level determination counter N is carried over to the next cycle. If in step S201 it is determined that the object confidence level in the previous cycle is below the predetermined level, or if in step S203 it is determined that the object detected in the previous cycle and the object detected in the current cycle are less likely to be the same, or if in step S204 it is determined that the number of tentative same-object determinations is equal to or greater than the predetermined value Mth, then the process proceeds to step S202, where it is determined that the object detected in the previous cycle and the object detected in the current cycle are different objects. Thereafter, the confidence-level determination counter N is reset.

Figure 7:
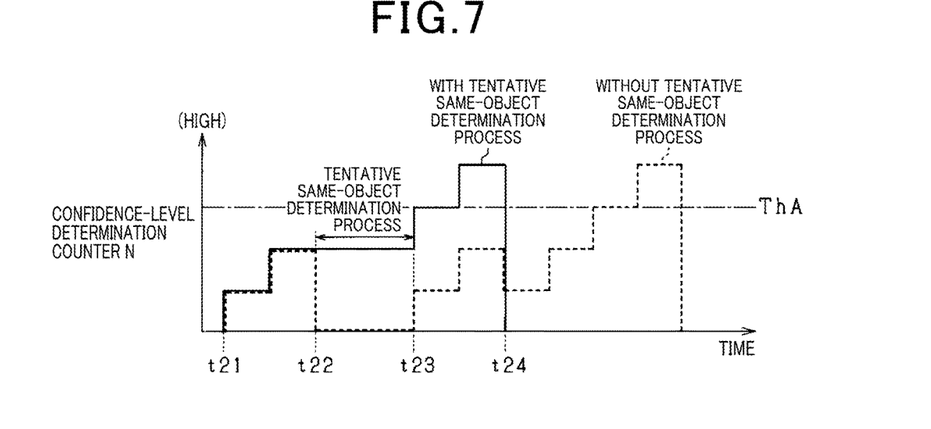
FIG. 7 is an example timing chart of the tentative same-object determination process.

An example of performing the tentative same-object determination process of the present embodiment will now be explained with reference to a timing chart of FIG. 7. In FIG. 7, the solid line indicates a temporal development of the confidence-level determination counter N for one of the four ranging sensors 20 (e.g., the first center sensor 21) with the tentative same-object determination process to be performed, the broken line indicates a temporal development of the confidence-level determination counter N without the tentative same-object determination process.

In FIG. 7, if the object position detected in the current cycle is within the first range of determination P with a small deviation between the predicted object position and the detected object position, it is determined that the object detected in the previous cycle and the object detected in the current cycle are the same and the confidence-level determination counter N is incremented (at and after t21). If the detected object position gets out of the first range of determination P (at t22) and then if the confidence-level determination counter N is equal to or greater than the predetermined value, the tentative same-object determination process is performed. In the tentative same-object determination process, if the detected object position is within the second range of determination Q, determining that the object detected in the previous cycle and the object detected in the current cycle are different objects is suspended and the value of the confidence-level determination counter N is left unchanged. If at time t23 it is determined that the object position detected in the current cycle is within the first range of determination P, incrementing of a same-object determination counter K is resumed. Thereafter, if the confidence-level determination counter N exceeds the counter threshold ThA, the intervention of the vehicle-object interaction avoidance control is permitted (at t24).

In contrast, in a configuration where the tentative same-object determination process is not performed, as indicated by the dashed line, the confidence-level determination counter N is reset at time t22 where it is determined that the object position detected in the current cycle is out of the first range of determination P. Accordingly, permitting the intervention of the vehicle-object interaction avoidance control will be delayed as compared with a configuration where the tentative same-object determination process is performed.

Figure 4B:
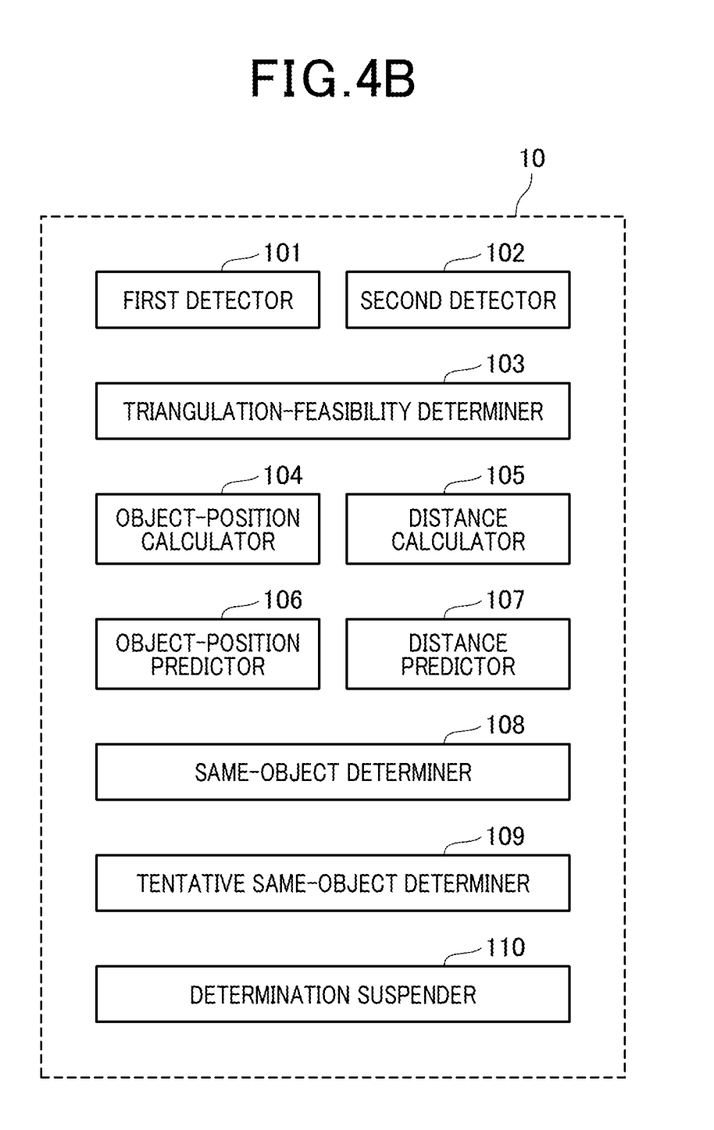
FIG. 4B is a functional block diagram of an electronic control unit of the object detection system.

FIG. 4B shows a functional block diagram of the ECU 10 that corresponds to the object detection apparatus of the present embodiment. The ECU 10 includes a first detector 101, a second detector 102, an object-position calculator 104, a same-object determiner 108, a tentative same-object determiner 109, a determination suspender 110, an object-position predictor 106, a triangulation-feasibility determiner 103, a distance calculator 105, a distance predictor 107. Functions of these functional blocks may be implemented by the CPU executing various programs stored in the ROM or the like.

In the ECU 10, the first detector 101 is configured to detect the object based on the direct wave 26 that is a first reflection of the probe wave 25 from the object 50, where the probe wave 25 and the first reflection 26 are respectively transmitted and received by the same ranging sensor that is a first ranging sensor 21 that is one of the plurality of ranging sensors 20. The second detector 102 is configured to detect the object based on the indirect wave 27 that is a second reflection of the probe wave 25 from the object 50, where the second reflection is received by a second ranging sensor 22 that is another one of the plurality of ranging sensors 20. The object-position calculator 104 is responsible for execution of step S102 based on the detections of the first and second detectors 101, 102.

In the ECU 10, the same-object determiner 108 is responsible for execution of step S104, the tentative same-object determiner 109 is responsible for execution of steps S203-S204, and the determination suspender 110 responsible for execution of step S205. Additionally, in the ECU 10, the object-position predictor 106 is responsible for execution of step S103, the triangulation-feasibility determiner 103 is responsible for execution of step S101, the distance calculator 105 is responsible for execution of step S110, and the distance predictor 107 is responsible for execution of step S110.

Although in the present embodiment the above process has been described as being performed based on the detections of the ranging sensors 21, 22. Practically, the above process is performed for each combination of adjacent sensors (active and passive sensors) among the ranging sensors 21-24.

The object detection apparatus of the present embodiment configured as above can provide the following advantages.

If it is determined based on the object position detected by the sensors in the previous cycle and the object position detected by the sensors in the current cycle that the object detected in the previous cycle and the object detected in the current cycle are not the same, then the tentative same-object determination process is performed without immediately determining that the object detected in the previous cycle and the object detected in the current cycle are different objects. In the tentative same-object determination process, it is determined whether or not the object detected in the previous cycle and the object detected in the current cycle are likely to be the same, on the condition that the object detected in the previous cycle has a predetermined or higher degree of confidence. More specifically, if it is determined that the object position detected in the current cycle is out of the first range of determination P centered at the predicted object position and then if the object detected in the previous cycle has a predetermined or higher degree of confidence, it is determined whether or not the object position detected in the current cycle is within the second range of determination Q. If is determined that the object detected in the previous cycle and the object detected in the current cycle are likely to be the same, then determining that the object detected in the previous cycle and the object detected in the current cycle are different objects is suspended.

The object detected in the previous cycle having a high degree of confidence is likely to be present in the current cycle, and transient detection errors may have occurred in detecting the object. An incorrect same-object determination caused by the transient errors that the object detected in the previous cycle and the object detected in the current cycle are different objects may lead to wastage of sensing information that has been accumulated in the current and previous cycles and may delay the intervention of the vehicle-object interaction avoidance control, which may prevent the vehicle-object interaction avoidance control from being properly performed. Addressing this concern, with the above configuration, even in the presence of transient detection errors, an incorrect same-object determination caused by the transient detection errors can be avoided.

In the tentative same-object determination process, determining that that the object detected in the previous cycle and the object detected in the current cycle are different objects is suspended, on the condition that the number of times of consecutively determining that the object detected in the previous cycle and the object detected in the current cycle are likely to be the same is less than the predetermined number of times. In situations where the tentative same-object determination process is consecutively performed the predetermined number of times or more despite that it is determined in the tentative same-object determination process that the object detected in the previous cycle and the object detected in the current cycle are likely to be the same, the object detected in the previous cycle and the object detected in the current cycle are likely to be different objects. Addressing this concern, with the configuration as described above, it can be accurately determined whether or not the object detected in the previous cycle and the object detected in the current cycle are the same.

If it is determined that the triangulation is infeasible in the current cycle, it is determined based on the comparison of the distance to the predicted object position (referred to as a predicted distance) and the distance to the object detected in the current cycle whether or not the object detected in the previous cycle and the object detected in the current cycle are the same, and further in the tentative same-object determination process it is determined whether or not the object detected in the previous cycle and the object detected in the current cycle are likely to be the same. Thus, even in the event where a coordinate point of the detected object is unable be determined by the triangulation, the same-object determination is made based on the distance information about the predicted distance and the distance to the detected object, which allows it to be rapidly determined that an object is present around the vehicle.

The ultrasonic sensors have a small detection error in the traveling direction of the vehicle while having a large calculation error in the widthwise direction of the vehicle, which can probably lead to an incorrect calculated object position. Therefore, the object detection system configured as above having the ultrasonic sensors as the ranging sensors 20 can prevent the same-object determination (i.e., determining that the object detected in the previous cycle and the object detected in the current cycle are the same) from being made based on the incorrect positional information. This allows the same-object determination to be made accurately.

(Other Embodiments)

There will now be explained some other embodiments that may be devised without departing from the spirit and scope of the present invention.

Figure 8:
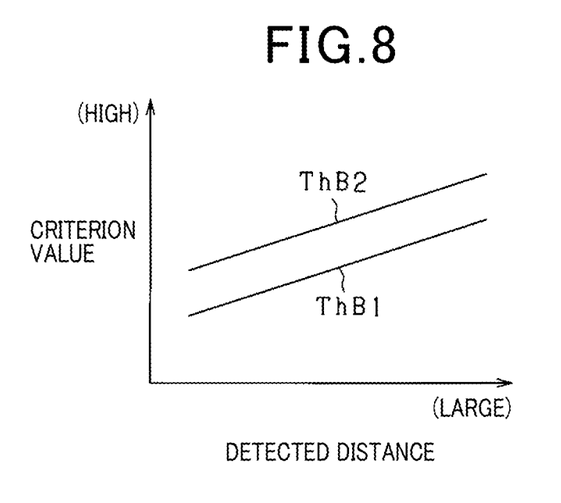
FIG. 8 is a schematic of maps of first and second determination thresholds versus detected distance.

(i) In the above embodiment, the first and second ranges of determination are fixed. Alternatively, at least one of the first and second ranges of determination may be variably set. For example, at least one of the first and second ranges of determination may be variably set based on the detected distance to the object. This is because the reflections from the object are weakened with increasing detected distance to the object, which may lead to a larger calculation error of the object position. As shown in FIG. 8, the first determination threshold ThB1 in the conditions (1-1) to (1-4) and the second determination threshold ThB2 in the conditions (2-1) to (2-4) may be increased with increasing detected distance to the object.

Figure 9:
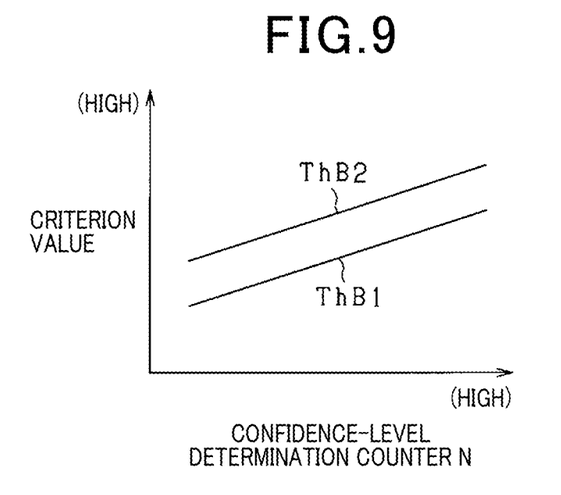
FIG. 9 is a schematic of maps of first and second determination thresholds versus confidence-level determination counter N.

(ii) In the above embodiment, the first and second ranges of determination are fixed. Alternatively, at least one of the first and second ranged of determination may be variably set such that it is less prone to be determined that the object detected in the previous cycle and the object detected in the current cycle are different objects as the confidence level of the object detected in the previous cycle increases. More specifically, as shown in FIG. 9, the first determination threshold ThB1 in the conditions (1-1) to (1-4) and the second determination threshold ThB2 in the conditions (2-1) to (2-4) may be increased with increasing value of the confidence-level determination counter N in the previous cycle.

(iii) In the above embodiment, the first and second ranges of determination are fixed. Alternatively, at least one of the first and second ranges of determination may be variably set based on the detected distance to the object and the confidence level of the object detected in the previous cycle. For example, using the maps as shown in FIGS. 8 and 9, both the first determination threshold ThB1 in the conditions (1-1) to (1-4) and the second determination threshold ThB2 in the conditions (2-1) to (2-4) may be variably set based on the detected distance to the object and the confidence level of the object detected in the previous cycle. Still alternatively, the first determination threshold ThB1 in the conditions (1-1) to (1-4) may be variably set using the maps of FIGS. 8 and 9, based on the detected distance to the object and the confidence level of the object detected in the previous cycle, and the second determination threshold ThB2 may be variably set using the maps of FIG. 8, based on the detected distance to the object.

(iv) In the above embodiment, the first and second ranges of determination are fixed. Alternatively, at least one of the first and second ranges of determination may be variably set based on parameters of an ambient environment around the vehicle 30. The reflections of the ultrasonic waves transmitted by the ranging sensors 20 are varied with the outside air temperature, the humidity, the wind strength or the like, which may lead to accordingly different calculation errors of the object position. More specifically, the reflections are prone to weaken with increasing outside air temperature, the reflections are prone to weaken with increasing humidity, and the reflections are prone to weaken with increasing wind strength. Accordingly, the calculation error of the object position is prone to increase. Addressing this concern, with the configuration as described above, it can be more accurately determined whether or not the object detected in the previous cycle and the object detected in the current cycle are the same.

(v) In the above embodiment, if it is determined that the triangulation is feasible and then if all the conditions (1-1) to (1-4) are met, it is determined whether or not the object detected in the previous cycle and the object detected in the current cycle are the same. Alternatively, if it is determined that the triangulation is feasible and then if the conditions (1-1) and (1-2) regarding the x- and y-coordinates of the object position are met, it may be determined whether or not the object detected in the previous cycle and the object detected in the current cycle are the same. In such an alternative embodiment, the determination of whether or not the conditions (1-3) and (1-4) are met is not made.

(vi) In the tentative same-object determination process of the above present embodiment, if all the conditions (2-1) to (2-4) are met, it is determined whether or not the object detected in the previous cycle and the object detected in the current cycle are likely to be the same. Alternatively, if the conditions (2-1) and (2-2) regarding the x- and y-coordinates of the object position are met, it may be determined whether or not the object detected in the previous cycle and the object detected in the current cycle are the same in such an alternative embodiment, the determination of whether or not the conditions (2-3) and (2-4) are met is not made.

(vii) In the above embodiment, if it is determined that the triangulation is feasible, then using the coordinates of the object position, it is determined whether or not the object detected in the previous cycle and the object detected in the current cycle are the same and it is determined whether or not the object detected in the previous cycle and the object detected in the current cycle are likely to be the same. Alternatively, instead of using the coordinates of the object position, using angles and distances of the object detected by the ranging sensors 20, it is determined whether or not the object detected in the previous cycle and the object detected in the current cycle are the same and it is determined whether or not the object detected in the previous cycle and the object detected in the current cycle are likely to be the same.

(viii) In the above embodiment, it is determined based on a deviation between the predicted object position and the detected object position, whether or not the object detected in the previous cycle and the object detected in the current cycle are the same. Alternatively, it may be determined based on a deviation between the detected object position in the previous cycle and the detected position in the current cycle, whether or not the object detected in the previous cycle and the object detected in the current cycle are the same.

(ix) In the above embodiment, if it is determined that the triangulation is infeasible, then based on the detected distance to the object, it is determined whether or not the object detected in the previous cycle and the object detected in the current cycle are the same, and it is determined whether or not the object detected in the previous cycle and the object detected in the current cycle are likely to be the same. Then based on the determinations, the confidence-level determination counter N is updated. Alternatively, if it is determined that the triangulation is infeasible, then the confidence-level determination counter N may not be updated.

(x) In the above embodiment, the ranging sensors 20 are attached to the front and rear portions of the vehicle 30 to detect an object around the vehicle 30. Alternatively or additionally, the ranging sensors 20 may be attached to the right- and left-side surface portions of the vehicle 30 to detect an object around the vehicle 30.

(xi) In the above embodiment, the ranging sensors 20 are ultrasonic sensors adapted to use an ultrasonic wave as a probe wave to detect an object. Alternatively, the ranging sensors 20 may be any other sensors capable of transmitting a probe wave and receive a reflection of the probe wave to thereby detect an object. The ranging sensors 20 may include millimeter-wave radar or laser radar or the like adapted to use an electromagnetic wave to detect an object.

(xii) In the above embodiment, the object detection apparatus is mounted in the vehicle. Alternatively, the object detection apparatus may be mounted in a moving object other than the vehicle, such as an airplane, a ship, a robot or the like.

What is claimed is:

1. An object detection apparatus for detecting an object around a moving object with a plurality of ranging sensors attached to the moving object by transmitting a probe wave and receiving reflections of the probe wave from the object via the plurality of ranging sensors, the apparatus comprising:

a central processing unit (CPU);
a memory;
a first detector configured to, using the CPU, detect the object based on a direct wave that is a first reflection of the probe wave from the object, the probe wave and the first reflection being respectively transmitted and received by the same ranging sensor that is a first ranging sensor that is one of the plurality of ranging sensors;
a second detector configured to, using the CPU, detect the object based on an indirect wave that is a second reflection of the probe wave from the object, the second reflection being received by a second ranging sensor that is another one of the plurality of ranging sensors;
an object-position calculator configured to, using the CPU, calculate an object position as a position of the object based on the detections of the first and second detectors according to the principle of triangulation;
a same-object determiner configured to, using the CPU, based on past object positions calculated by the object-position calculator in previous cycles and the object position calculated by the object-position calculator in a current cycle, determine whether or not the object detected by the first and second detectors in an immediately previous cycle and the object detected by the first and second detectors in the current cycle are the same;
a tentative same-object determiner configured to, using the CPU, if it is determined by the same-object determiner that the object detected by the first and second detectors in the immediately previous cycle and the object detected by the first and second detectors in the current cycle are not the same and then if a degree of confidence of the object position calculated by the object-position calculator in the immediately previous cycle is equal to or greater than a predetermined value, determine whether or not the object detected by the first and second detectors in the immediately previous cycle and the object detected by the first and second detectors in the current cycle are likely to be the same, the degree of confidence of the object position being a number of times the object detected by the first and second detectors in the immediately previous cycle was determined to be the same in the previous cycles; and
a determination suspender configured to, using the CPU, if it is determined by the tentative same-object determiner that the object detected by the first and second detectors in the immediately previous cycle and the object detected by the first and second detectors in the current cycle are likely to be the same, suspend determining that the object detected by the first and second detectors in the immediately previous cycle and the object detected by the first and second detectors in the current cycle are not the same,
wherein, in response to determining that the object detected by the first and second detectors in the immediately previous cycle and the object detected by the first and second detectors in the current cycle are the same, the degree of confidence is incremented, and as a result of the incremented degree of confidence being greater than a predetermining threshold, a vehicle-object interaction avoidance control intervenes.

2. The apparatus of claim 1, further comprising an object-position predictor configured to, using the CPU, based on a history of past object positions calculated by the object-position calculator in the previous cycles, predict the object position in the current cycle,
wherein the same-object determiner is configured to, based on a positional relationship between the object position predicted by the object-position predictor and the object position calculated by the object-position calculator in the current cycle, determine whether or not the object detected by the first and second detectors in the immediately previous cycle and the object detected by the first and second detectors in the current cycle are the same.

3. The apparatus of claim 2, wherein the same-object determiner is configured to, if the object position calculated by the object-position calculator in the current cycle is within a first range of determination including therein the object position predicted by the object-position predictor, determine that the object detected by the first and second detectors in the immediately previous cycle and the object detected by the first and second detectors in the current cycle are the same, and the tentative same-object determiner is configured to, if the object position calculated by the object-position calculator in the current cycle is within a second range of determination surrounding the first range of determination, determine that the object detected by the first and second detectors in the immediately previous cycle and the object detected by the first and second detectors in the current cycle are likely to be the same.

4. The apparatus of claim 3, wherein at least one of the first and second ranges of determination is variably set based on a distance to the object detected by the first and second detectors.

5. The apparatus of claim 3, wherein at least one of the first and second ranges of determination is variably set based on the degree of confidence of the object position calculated by the object-position calculator in the immediately previous cycle.

6. The apparatus of claim 2, further comprising:
a triangulation-feasibility determiner configured to, using the CPU, determine whether or not the triangulation is feasible in the current cycle;
a distance calculator configured to, using the CPU, based on detections of the first and second detectors, calculate distances to the object respectively detected by the first and second detectors; and
a distance predictor configured to, using the CPU, based on the object position predicted by the object-position predictor, calculate distances to the object respectively detected by the first and second detectors,
wherein the same-object determiner is configured to, if it is determined by the triangulation-feasibility determiner that the triangulation is infeasible in the current cycle, determine whether or not the object detected by the first and second detectors in the immediately previous cycle and the object detected by the first and second detectors in the current cycle are the same based on a comparison of the distances to the object calculated by the distance predictor and the distances to the object calculated by the distance calculator, and the tentative same-object determiner is configured to, if it is determined that the triangulation is infeasible in the current cycle, determine whether or not the object detected by the first and second detectors in the immediately previous cycle and the object detected by the first and second detectors in the current cycle are likely to be the same based on the comparison of the distance to the object predicted by the distance predictor and the distance to the object calculated by the distance calculator.

7. The apparatus of claim 1, wherein the tentative same-object determiner is configured to, if a number of times of consecutively determining that the object detected by the first and second detectors in the immediately previous cycle and the object detected by the first and second detectors in the current cycle are likely to be the same becomes equal to or greater than a predetermined number of times, determine that the object detected by the first and second detectors in the immediately previous cycle and the object detected by the first and second detectors in the current cycle are not the same.

8. The apparatus of claim 1, wherein each of the plurality of ranging sensors is an ultrasonic sensor capable of transmitting an ultrasonic wave as the probe wave.

9. The apparatus of claim 1, wherein the first and second ranging sensors are a pair of adjacent ranging sensors.

10. The apparatus of claim 1, wherein the moving object is a vehicle, and the apparatus is mounted in the vehicle.

* * * * *

UNITED STATES PATENT AND TRADEMARK OFFICE
CERTIFICATE OF CORRECTION

PATENT NO.       : 10,210,435 B2
APPLICATION NO.  : 14/918920
DATED            : February 19, 2019
INVENTOR(S)      : Masumi Fukuman et al.

Page 1 of 1

It is certified that error appears in the above-identified patent and that said Letters Patent is hereby corrected as shown below:

In the Claims

In Column 17, Line 1, Claim 1, change "predetermining" to --predetermined--.

Signed and Sealed this
Twenty-eighth Day of May, 2019

Andrei Iancu
*Director of the United States Patent and Trademark Office*